United States Patent
Saitou et al.

(10) Patent No.: US 8,593,263 B2
(45) Date of Patent: Nov. 26, 2013

(54) CONTROL/MONITOR SIGNAL TRANSMISSION SYSTEM

(75) Inventors: Yoshitane Saitou, Kameoka (JP); Kenji Nihikido, Takatsuki (JP)

(73) Assignee: Anywire Corporation, Kyoto (JP)

(*) Notice: Subject to any disclaimer, the term of this patent is extended or adjusted under 35 U.S.C. 154(b) by 891 days.

(21) Appl. No.: 12/507,942

(22) Filed: Jul. 23, 2009

(65) Prior Publication Data

US 2010/0045477 A1   Feb. 25, 2010

(30) Foreign Application Priority Data

Aug. 25, 2008 (JP) .................. 2008-215024

(51) Int. Cl.
G08C 19/16 (2006.01)

(52) U.S. Cl.
USPC .............. 340/12.32; 340/533; 340/572.1; 340/572.4; 340/572.8; 340/572.9; 340/573.1; 340/573.4; 340/10.5; 340/10.52; 340/12.19; 235/382; 235/385; 235/492; 700/215; 700/217; 700/224

(58) Field of Classification Search
None
See application file for complete search history.

(56) References Cited

U.S. PATENT DOCUMENTS

| | | | | |
|---|---|---|---|---|
| 5,487,088 | A * | 1/1996 | Weltz et al. | 315/276 |
| 6,035,263 | A * | 3/2000 | Jeon | 702/122 |
| 7,428,251 | B2 | 9/2008 | Saitou et al. | |
| 2005/0054355 | A1* | 3/2005 | Saitou et al. | 455/463 |
| 2006/0097873 | A1* | 5/2006 | Vrba et al. | 340/572.1 |
| 2007/0069765 | A1* | 3/2007 | Cummings | 326/46 |
| 2008/0101383 | A1* | 5/2008 | Lietz et al. | 370/400 |
| 2008/0221707 | A1 | 9/2008 | Saitou et al. | |

FOREIGN PATENT DOCUMENTS

| | | |
|---|---|---|
| JP | 3-006997 | 1/1991 |
| JP | 9-035876 | 2/1997 |
| JP | 2005-080256 | 3/2005 |
| WO | 2004/010645 | 1/2004 |
| WO | 2006/069859 | 7/2006 |
| WO | 2007/118656 | 10/2007 |

OTHER PUBLICATIONS

Japanese Office Action from Japan Patent Office, mailed Dec. 7, 2010.
Extended European Search Report from E.P.O., mailed Dec. 22, 2010.
English language Abstract of JP 3-006997, Jan. 14, 1991.
English language Abstract of JP 2005-080256, Mar. 24, 2005.

* cited by examiner

*Primary Examiner* — Benjamin C Lee
*Assistant Examiner* — Curtis King
(74) *Attorney, Agent, or Firm* — Greenblum & Bernstein, P.L.C.

(57) ABSTRACT

A control/monitor signal transmission system in which simple communication control can be performed without a control unit, and a wiring allowable distance is larger than a conventional system. A plurality of slave stations which are installed corresponding to the plurality of actuating apparatuses and are connected through a common data signal line, and a mediation station which is connected to the data signal line are equipped, and the data signal line includes a plurality of independent groups which are consolidated to the mediation station. The plurality of actuating apparatuses are divided into one or plural sets including at least two, and the actuating apparatuses which belong to the same set and are different in group of the connected data signal line have a correspondence relationship. The mediation station extracts monitor data from a monitor signal transmitted from the sensor unit through the slave station, and transmits the monitor data as control data to a different actuating apparatus which has a correspondence relationship with the actuating apparatus including the sensor unit which transmits the monitor data.

7 Claims, 13 Drawing Sheets

CONTROL/MONITOR SIGNAL TRANSMISSION SYSTEM

BACKGROUND OF THE INVENTION

1. Field of the Invention

The present invention relates to a control/monitor signal transmission system, and more particularly, to a control/monitor signal transmission system with a simple configuration in which a mediation station is installed in place of a PLC (programmable logic controller) and a computer which are control units and a master station. The present invention relates to a concept of a so-called wiring-saving system in which wirings between devices can be omitted in such a way that due to such a configuration, a parallel control signal from a control unit is converted into a serial signal and transmitted, and an actuating device side which is distantly-positioned converts the serial signal into a parallel signal to perform device control. In a regular control in which output with respect to input is constant while performing such wiring omission, as more simple control is performed, a design is simplified, and equipment is simplified. The present invention relates a control/monitor signal transmission system in which, in a regular control in which output with respect to input is constant, a power signal is superimposed onto a transmission signal, and a monitor signal and a control signal are superimposed onto a clock signal.

2. Description of the Related Art

Typically, even control for performing simple input/output control has been performed through determination of a central control system. As a central control system, there are a host computer, a PLC (programmable logic controller), and a wiring-saving master station. Control/monitor signal transmission systems in which the central control systems, and a lamp and an electromagnetic valve which are controlled apparatuses or a wiring-saving output unit (which is a control unit which converts a communication control signal from a parallel signal into a serial signal and combining the serial signal to thereby reduce the number of wirings, and can select and use appropriate units of, for example, at least 1 terminal to 32 terminals) perform communication control, and transmit monitor signals from a plurality of sensor sections (on-off states of, for example, switches and phototransistors) which are distantly-positioned are being widely used in an automatic control technology field.

Meanwhile, in the automatic control technology field, methods for more simply performing communication control have been suggested. For example, Patent Document 1 discloses a control/monitor signal transmission system which includes a plurality of slave stations which are installed corresponding to a plurality of controlled apparatuses and are connected to a common data signal line and corresponding controlled apparatuses, and a mediation station which is connected to a common data signal line and transmits a monitor signal transmitted from a predetermined controlled apparatuses as a control signal of a predetermined corresponding controlled apparatus. In the control/monitor signal transmission system, a mediation station transmits a signal of an input unit to an output unit without involving a control unit in place of a master station, so that simple communication control can be performed without a control section.

SUMMARY OF THE INVENTION

However, in the control/monitor signal transmission system using the mediation station, if a data signal line is too long, there is a problem in that a signal is not transmitted to an end, and a length thereof, that is, a wiring allowable distance, is limited. For this reason, there is a problem in that it cannot be used when a distance between controlled apparatus which are dispersedly arranged is too long.

It is an object of the present invention to provide a control/monitor signal transmission system in which simple communication control can be performed without a control section, and a wiring allowable distance is larger than that of a conventional system.

A control/monitor signal transmission system according to the present invention includes a plurality of actuating apparatuses each of which includes an actuator unit and a sensor unit which monitors the actuator unit, a plurality of slave stations which are installed corresponding to the plurality of actuating apparatuses and are connected through a common data line, and a mediation station which is connected to the data signal line. The actuating apparatus of the present invention corresponds to a controlled apparatus of a conventional control/monitor signal transmission system. If the actuator unit of the present invention is one which performs an operation which a user intends to do, it may not be one which perform movement such as expansion and flexion, and it may include a lamp as well as, for example, a solenoid, a relay, or an electromagnet value.

The data signal line includes a plurality of independent groups which are consolidated to the mediation station.

The plurality of actuating apparatuses are divided into one or plural sets including at least two, and the actuating apparatuses which belong to the same set and are different in group of the connected data signal line have a correspondence relationship.

The mediation station extracts monitor data from a monitor signal transmitted from the sensor unit through the slave station, and transmits the monitor data as control data to a different actuating apparatus which is in a correspondence relationship with the actuating apparatus including the sensor unit which transmits the monitor data.

Transmission from the mediation station to the different actuating apparatus which is in the correspondence relationship may be performed for each minimum unit of the monitor data. Or, the transmission may be performed for each block which includes a predetermined number of minimum units of the monitor data.

A signal of the control data may have an output period during which data is output from the mediation station to the actuating apparatus and an input period during which data is input from the actuating apparatus to the mediation station.

The control data may be transmitted subsequent to a start signal which represents a start of transmission, and the slave station may update a sequential address count by the clock signal, starting from the start signal, based on the start signal and a clock signal which configures the control data and perform transmission synchronization.

The groups may be respectively separately extended from a mediation station. What the groups are separately extended means that the groups are extended in appropriate directions. For example, two groups may be extended from a mediation station in directions opposite to each other or in the same direction as each other. Also, a plurality of groups may be extended in individual directions from a mediation station, that is, may be START connected centering on a mediation station.

DESCRIPTION OF THE PREFERRED EMBODIMENTS

Figure 1:
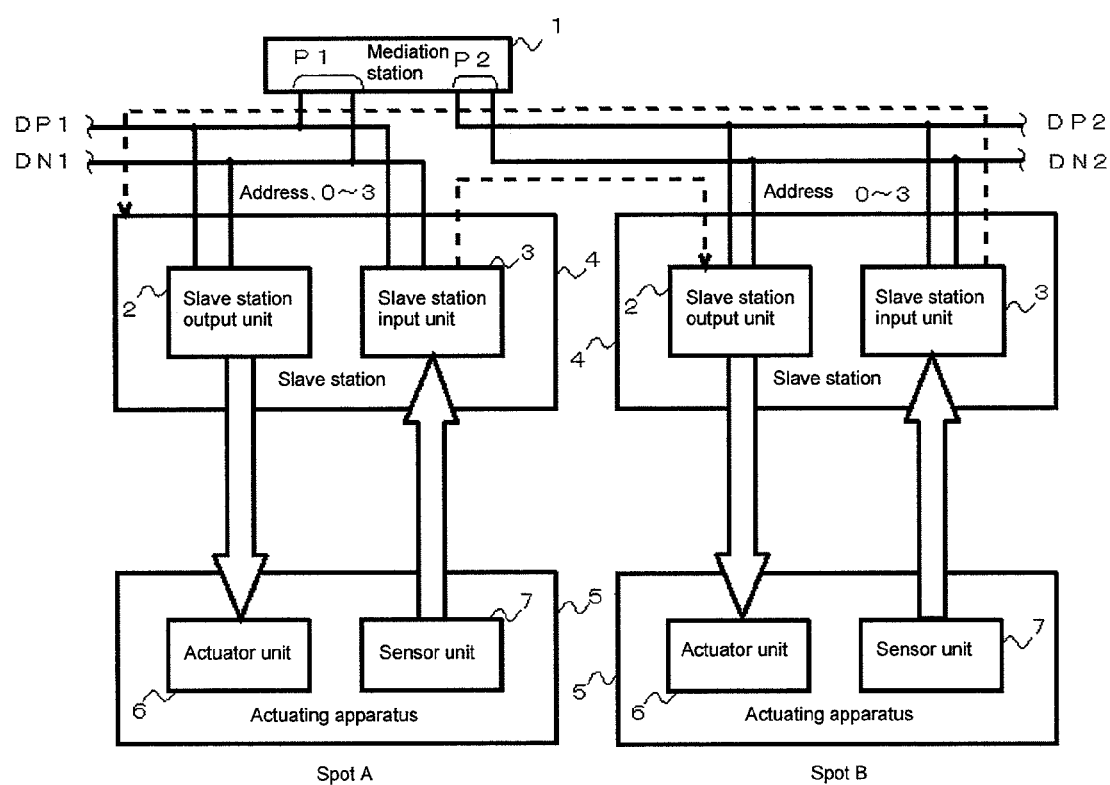
FIG. 1 is an overall configuration diagram of a control/monitor signal transmission system according to an embodiment of the present invention.
Figure 2:
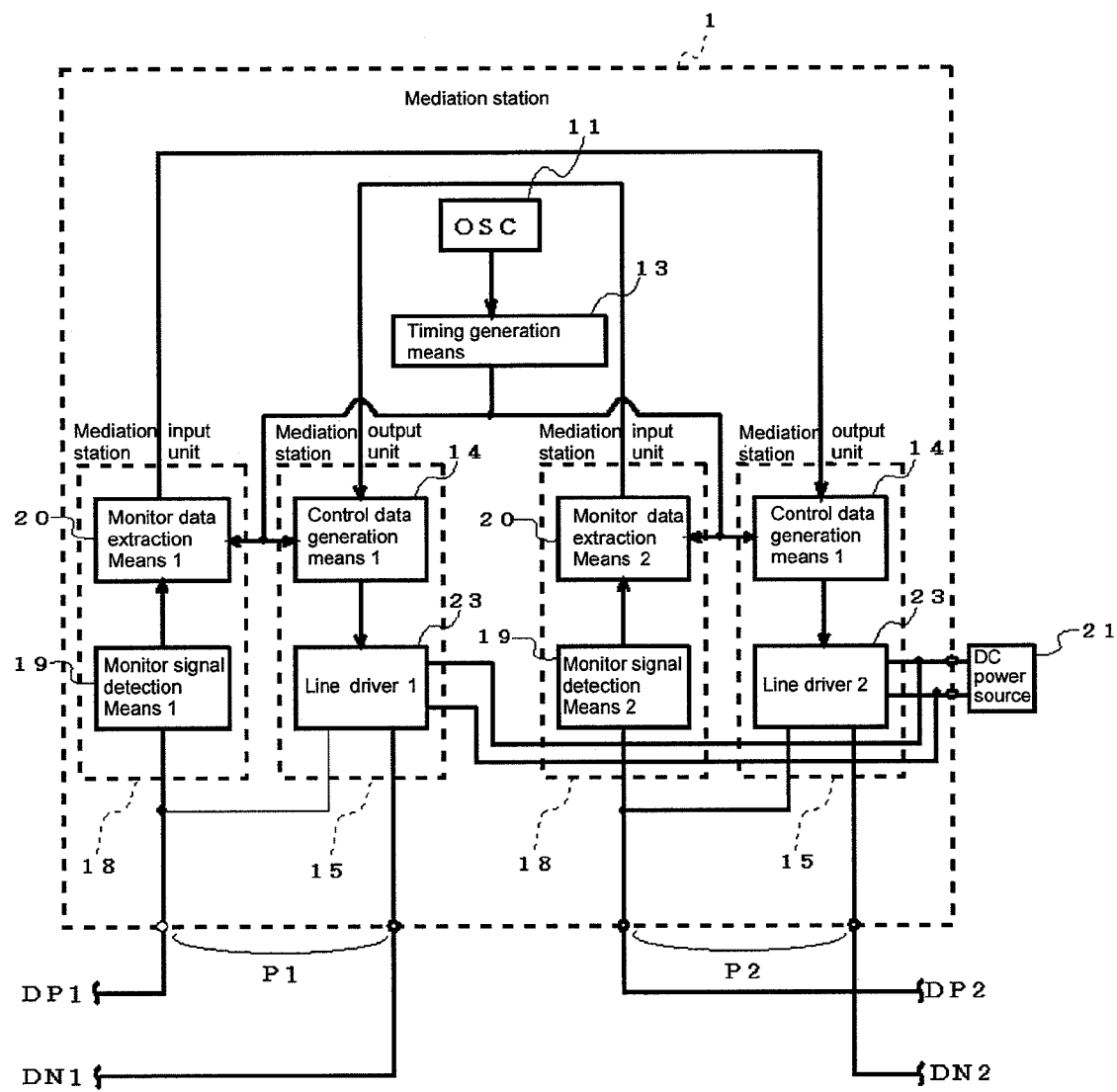
FIG. 2 is a functional block diagram of a mediation station.
Figure 3:
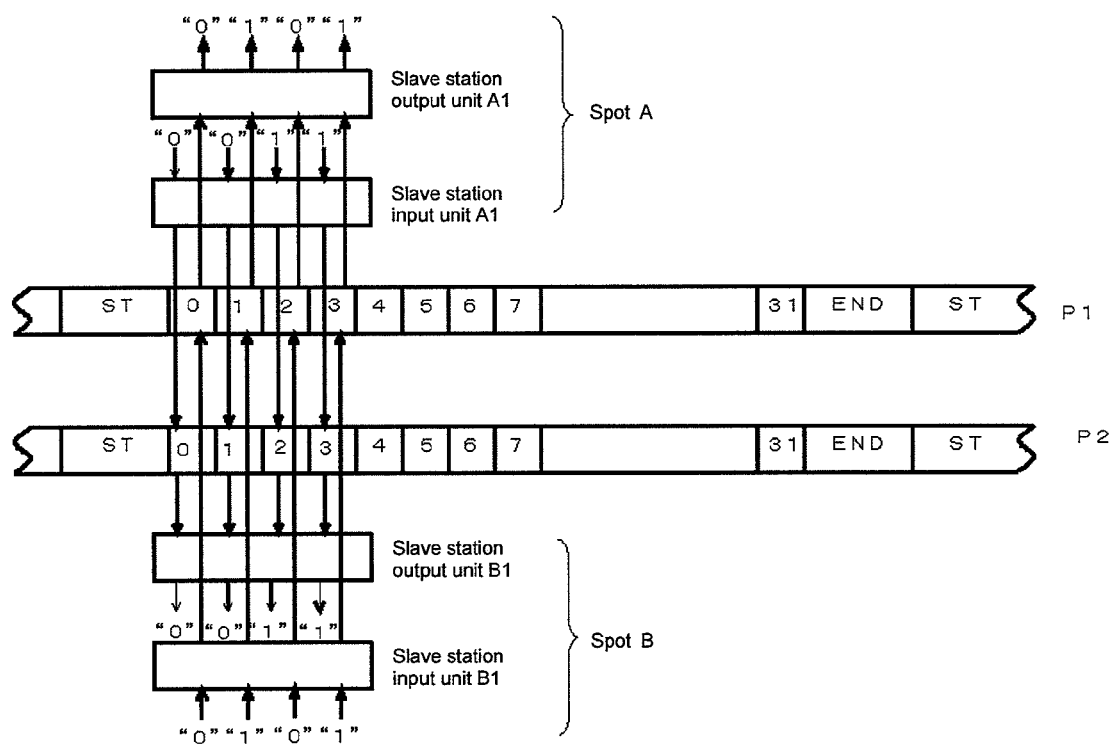
FIG. 3 is a view illustrating a frame format of transmission signals.

Hereinafter, embodiments of the present invention will be described with reference to the accompanying drawings. FIG. 1 is an overall configuration diagram of a control/monitor signal transmission system according to an embodiment of the present invention, FIG. 2 is a functional block diagram of a mediation station, and FIG. 3 is a view illustrating a frame format of transmission signals.

As illustrated in FIG. 1, a control/monitor signal transmission system includes one mediation station 1, a plurality of slave stations 4 which are connected to the mediation station 1 through common data lines DP1, DP2, DN1, and DN2, and a plurality of actuating devices 5 which are connected to the plurality of slave stations 4, respectively.

The data signal lines DP1, DP2, DN1, and DN2 (hereinafter, a "data signal line" is referred to as a "signal line") include two independent groups P1 and P2 which are consolidated to the mediation station. In this embodiment, the group P1 includes the signal lines DP1 and DN1 which are wired to a spot A, and the group P2 includes the signal lines DP2 and DN2 which are wired to a spot B. The actuating devices 5 are divided into one or plural sets including at least two, and the actuating devices 5 which belong to the same set and are different in group connected are regarded as having a correspondence relationship. For example, in the case in which 5 actuating devices are installed for the group P1 (the spot A) and the group P2 (the spot B), respectively, if one actuating device of the group P1 and one actuating device of the group P2 are set as one set, they are divided into 5 sets, and one pair of each set has a correspondence relationship. If an address, which will be described later, for example, 0 to 5, is imparted to each set, the actuating devices which are in the correspondence relationship have the same address. When one more group is prepared in addition to the spot A and the spot B, for example, when 5 actuating devices are installed in a spot C, if three are set as one set, the actuating devices which are installed in the points A, B and C, respectively, have the correspondence relationship.

Each actuating device 5 includes an actuator unit 6 and a sensor unit 7 which monitors the actuator unit 6 (or the actuating device periphery). The actuator unit 6 includes various parts which configure the actuating device 5, for example, a solenoid, a relay, an electromagnetic valve, or a lamp. The sensor unit 7 is selected corresponding to a corresponding actuator unit 6, includes, for example, a phototransistor or a push button switch, and inputs an on-off state (a two-value signal). Here, there is no limitation on a signal input from the sensor unit 7, and a two- or more-value signal may be input.

In the plurality of actuating devices 5, a control signal is transmitted to the actuator unit 6 through the signal lines DP1 and DN1 or the signal line DP2 and DN2 and the slave station 4. A monitor signal (sensor signal) from the sensor unit 7 is transmitted through the slave station 4 and the signal lines DP1 and DN1 or the signal line DP2 and DN2. A monitor signal and a control signal which are transmitted through the signal lines DP1, DN1, DP2, and DN2 are serial signals. The signal lines DP1 and DN1 or the signal lines DP1 and DN2 are used to supply a power source voltage Vx and a clock signal CK and (virtually) bi-directionally transmit a monitor signal and a control signal, which will be described later.

The plurality of slave stations 4 are installed corresponding to the plurality of actuating apparatuses 5, are connected to the signal lines DP1 and DN1 or the signal lines DP2 and DN2 at arbitrary locations, and are connected to corresponding actuating apparatuses 5. Each slave station 4 includes a slave station output unit 2 and a slave station input unit 3, and the slave station output unit 2 and the slave station input unit 3 correspond to the actuator unit 6 and the sensor unit 7, respectively. A monitor signal input to the slave station input unit 3 and a control signal output from the slave station output unit 2 are plural-bit parallel signals. The slave station output unit 2 performs serial-to-parallel conversion of a control signal, and the slave station input unit 3 performs parallel-to-serial conversion of a monitor signal.

The signal lines DP1 and DN1 of the group P1 and the signal lines DP2 and DN2 of the group P2 are consolidated to the mediation station 1, and the mediation station 1 is connected to the plurality of slave stations 4 through the signal lines DP1, DN1, DP2, and DN2. The mediation station 1 does not obtain a control signal from a control unit such as a master station of a well-known control/monitor signal transmission system or transmit a monitor signal to a control unit, and, instead, transmits a monitor signal transmitted from (a sensor unit 7 of) a predetermined actuating device 5 as a control signal for (an actuator unit 6 of) a predetermined corresponding actuating device 5. In this regard, the mediation station 1 has a different configuration from a well-known master station. That is, as illustrated in FIG. 2, a monitor signal detection means 19 detects a monitor signal transmitted from the actuating device 5, and a monitor data extraction means 20 extracts monitor data from the monitor signal. The monitor data is transferred to a control data generation means 14, so that control data for a different actuating device 5 which is in a correspondence relationship is generated. A mediation station input unit 18 which includes the monitor signal detection means 19 and the monitor data extraction means 20 and a mediation output unit 15 which includes the control data generation means 14 and a line driver 23 are installed in the same number as the number of groups of the signal lines. Monitor data extracted by the monitor data extraction means 20 is transferred to a control data generation means 14 corresponding to a different group. Therefore, like the flow of data signal indicated by dotted lines in FIG. 1, a monitor signal from the sensor unit 7 which is obtained in the slave station input unit 3 of the spot B passes through the signal lines DP2 and DN2 and the mediation station 1, then passes through the signal lines DP1 and DN1 and the slave station output unit 2 of the spot A which is previously determined, and is finally output to the actuator unit 6 of the actuating device 5. When a monitor signal obtained by the sensor unit 7 is input to the slave station input unit 3 of the slave station 4 of the spot A which is previously determined, the monitor signal passes through the signal lines DP1 and DN1 and the mediation station 1, then passes through the signal lines DP2 and DN2 and the slave station output unit 2 of the spot B which is previously determined, and is finally output to the actuator unit 6 of the actuating device 5. Therefore, in the control/monitor signal transmission system, a control system can be set up without requiring a host computer and a PLC.

When a distance of each of the groups P1 and P2 is extended up to each wiring allowable distance, a wiring allowable distance of the whole system becomes twice of that of a conventional system. For example, if wiring allowable distances of transmission lines DP and DN are 100 m, an overall length from an end of the group P1 to an end of the group P2 can be 200 m by extending the group P1 and the group P2 in a direction opposite to each other from the mediation station 1. That is, a transmission rate is typically reduced, but there is an effect of being capable of increasing a transmission distance (between I and O) twice while maintaining a transmission rate and reliability "as is". There is no limitation on the number of groups and a direction, and transmission lines may be extended, respectively, in appropriate directions, from the mediation station, according to a function of the mediation station 1. For example, a START connection in which the mediation station 1 is centered is possible.

The control/monitor signal transmission system does not equip a power line (a power line of 24 V and a power line of 0V) and a local power source for supplying each of the plurality of slave stations 4 with a power source voltage Vx. As will be described later, electric power is supplied to the plurality of slave stations 4 through a power signal which is superimposed on a clock signal. The power signal has power capacity enough to sufficiently operate each of the plurality of slave stations 4.

The mediation station 1 further includes an oscillator (OSC) 11 and a timing generating unit 13 in addition to the mediation station output unit 15 and the mediation station input unit 18. The timing generating unit 13 generates a predetermined timing signal which is synchronized with a clock CK of a predetermined cycle t0 based on oscillation output which is output from the oscillator 11.

The mediation station input unit 18 includes the monitor signal detection means 19 and the monitor data extraction means 20 as described above. The monitor signal detection means 19 obtains a serial pulse voltage signal transmitted through the signal lines DP1 and DN1 or DP2 and DN2, and detects and outputs a monitor data signal which is superimposed on the serial pulse voltage signal. The data extraction means 20 synchronizes (wave-shapes) the detection output with a clock CK from the timing generation means 13 and outputs the synchronized signal to the control data generation means 14 of the mediation station output unit 15 which is connected to a different group.

The mediation station output unit 15 includes the control data signal generation means 14 and the line driver 23 as described above. The line driver 23 is connected to a DC power source 21 which generates a power source voltage Vx of a predetermined constant level. The control data signal generation means 14 superimposes each data value of a serial data string input from the monitor data extraction means 20 of a different group on a clock CK. Output of the control data signal generation means 14 is transmitted to the signal lines DP1 and DN1 or the signal lines DP2 and DN2 as a serial signal including a power source voltage through the line driver 23 which is an output circuit. A clock CK including the power source voltage is converted in level, output to terminals 16 and 17, and supplied to the signal lines DP1 and DN1 or the signal lines DP2 and DN2 as will be described later. That is, it is output as a relative potential difference between the two.

For example, a case in which a 4-bit monitor signal "0011" is output from the sensor unit 7 (actually, the corresponding slave station input unit 3)-to which 4 addresses 0 to 3 are allocated-of the actuating apparatus 5 of the spot A (the group P1) to the slave station input unit 3 of the corresponding slave station 4 of the spot B (the group P2) will be described below. In this case, the slave station input unit 3 counts a clock CK, superimposes the monitor signal "0011" onto a location of the addresses 0 to 3 of its own station, and outputs the superimposed signal to the signal lines DP1 and DN1 of the group P1. The mediation station input unit 18 which is connected to the group P1 of the mediation station 1 extracts the monitor signal "0011" and inputs the extracted monitor signal to the mediation output unit 15 which is connected to the group P2 as a control signal "0011". The mediation output unit 15 counts a clock CK, superimposes it onto a location of the same addresses 0 to 3 as the addresses at which the control signal "0011" is extracted, and output the superimposed signal to the signal lines DP2 and DN2 of the group P2. In the spot B which is distant from the spot A, the slave station output unit 2 corresponding to the actuator unit 6 to which the addresses 0 to 3 are allocated extracts the control signal "0011" superimposed onto the location of the addresses 0 to 3 and output the control signal to the corresponding actuator unit 6. Therefore, signal input/output is performed between the slave stations 4 of the points A and B in which an address of the slave station input unit 3 and an address of the slave station output unit 2 coincide with each other.

Then, when a monitor signal, for example, "0101", is output to the corresponding slave station output unit 2 from the sensor unit 7 of the spot B to which the same addresses 0 to 3 are imparted, the slave station input unit 3 counts a clock CK of the monitor signal, superimposes it onto a location of the addresses 0 to 3, and output the superimposed signal to the signal lines DP2 and DN2 of the group P2. In the mediation station 1, the mediation station input unit 18 connected to the group P2 extracts the monitor signal and inputs the extracted monitor signal to the mediation output unit 15 connected to the group P1 as a control signal. The mediation output unit 15 superimposes the control signal onto a location of the addresses 0 to 3 and outputs the superimposed signal to the signal lines DP1 and DN1 of the group P1. The slave station output unit 2 of the spot A to which the addresses 0 to 3 are allocated extracts the control signal which is superimposed onto a location of the addresses 0 to 3 and outputs the extracted control signal to the corresponding actuator unit 6 of the spot A in the same way as the case described above.

Therefore, one cycle of monitor/control signal transmission (for example, predetermined addresses 0 to 31 or from a start signal ST to an end signal END) is completed. Signal transmission is repeated using one cycle as a unit.

Here, a correspondence between an input signal and an output signal is not limited to 1:1 described above, a correspondence relationship may variously change. For example, when the group P3 installed in the spot C is disposed in addition to the groups P1 and P2 and an input signal from the slave station input unit 3 of the spot A is transmitted to the slave station output unit 2 of the spot B as an output signal, not only an input signal from the slave station input unit 3 of the spot B may be transmitted to the slave station unit 2 of the spot A as an output signal as described above, but also an input signal from the slave station input unit 3 of the spot A may be transmitted to the slave station output unit 2 of the spot C which includes only a slave station output unit as an output signal. That is, an input signal from the slave station input unit 3 of the spot A may be transmitted to the slave station output units 2 of the points B and C as an output signal.

In transmission of the monitor/control signal transmission system, a signal from the slave station input unit 3 of a certain address is transmitted to the slave station output unit 2 of the same address within the same cycle of a clock CK. That is, an address (an input address) of a monitor signal is identical in transmission cycle to an address (an output address) of a control signal (therefore, referred as an "input/output address"). Therefore, an output signal may be transmitted (supplied) to the corresponding (same address) slave station 4 by transmitting an input signal to the slave station 4. A concrete circuit configuration for implementing the above-described transmission method will be described below.

Figure 4:
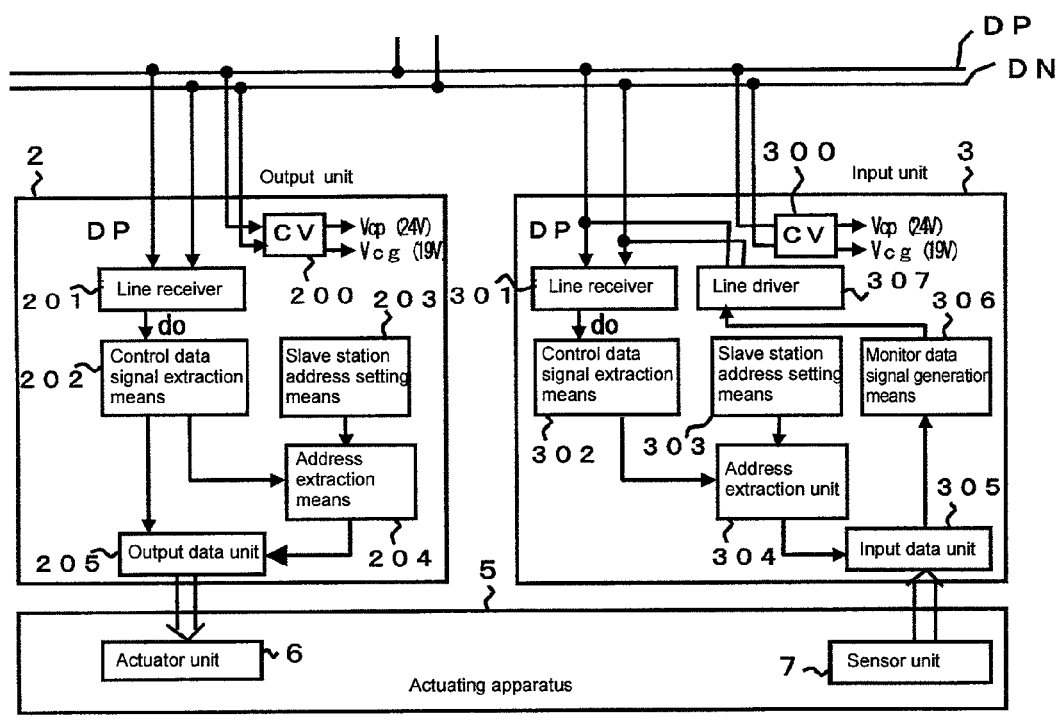
FIG. 4 is a functional block diagram of the slave station output unit, the slave station input unit and the actuating apparatus.
Figure 5:
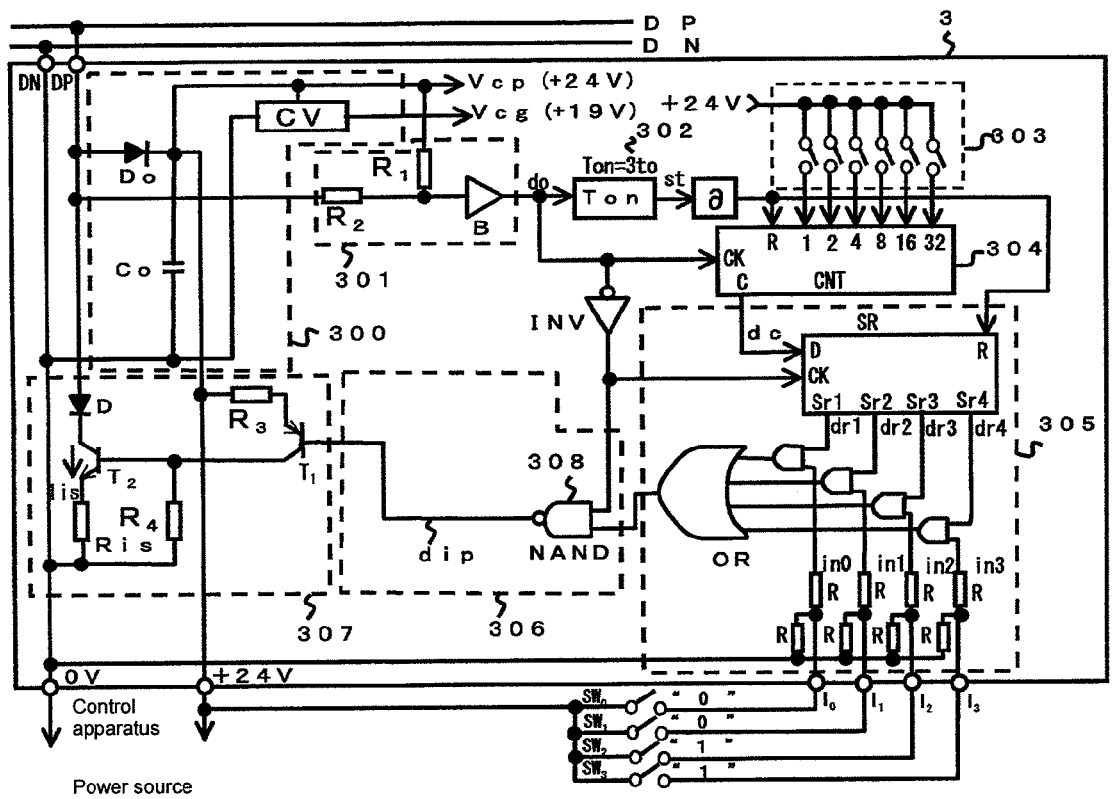
FIG. 5 is a schematic functional block diagram of the slave station input unit.
Figure 6:
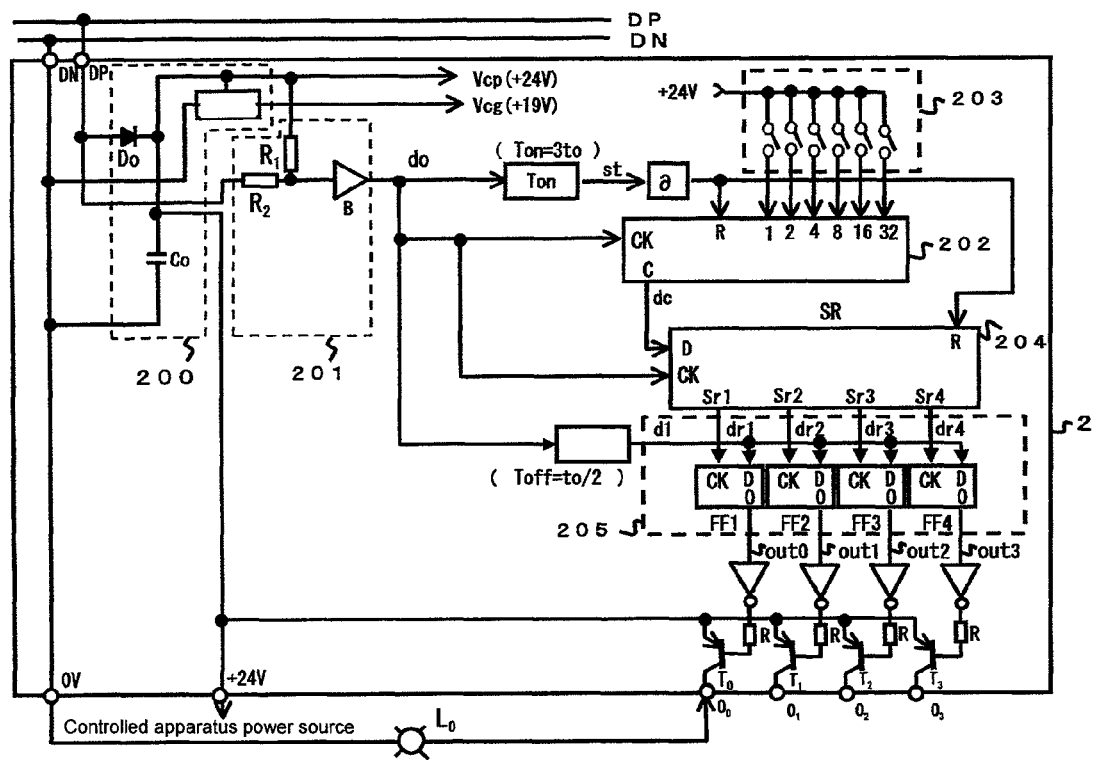
FIG. 6 is a schematic block diagram of the slave station output unit.
Figure 7:
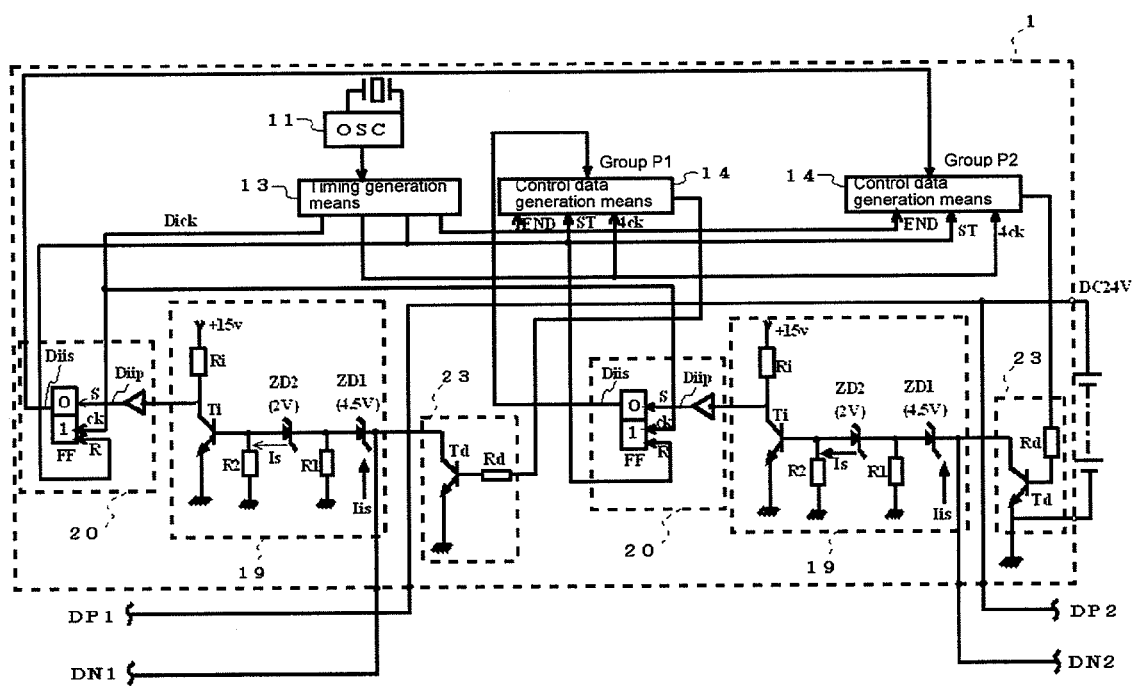
FIG. 7 is a schematic functional block diagram of the mediation station.
Figure 8:
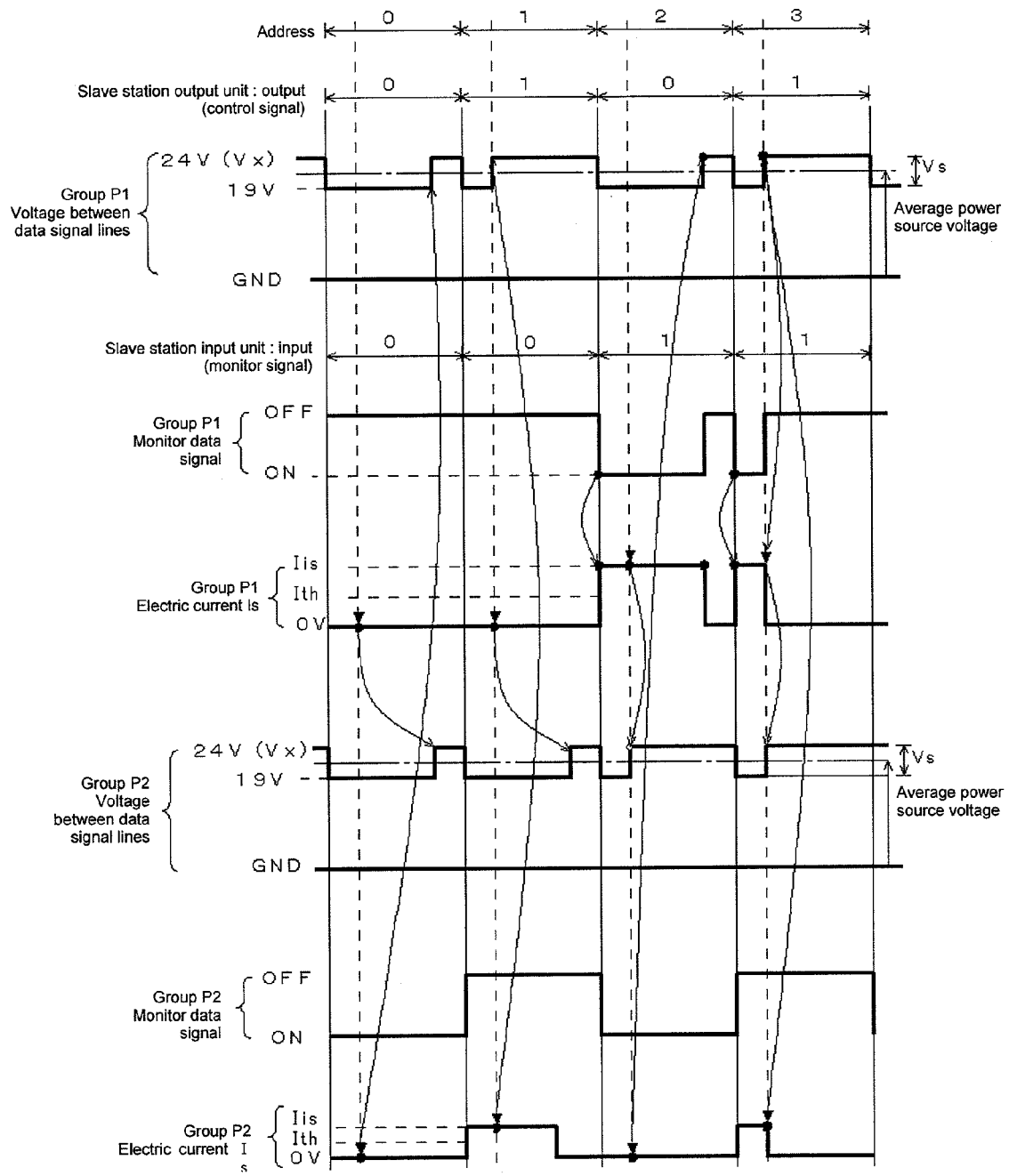
FIG. 8 is a time chart of the monitor/control signal transmission system according to an exemplary embodiment of the present invention.
Figure 9:
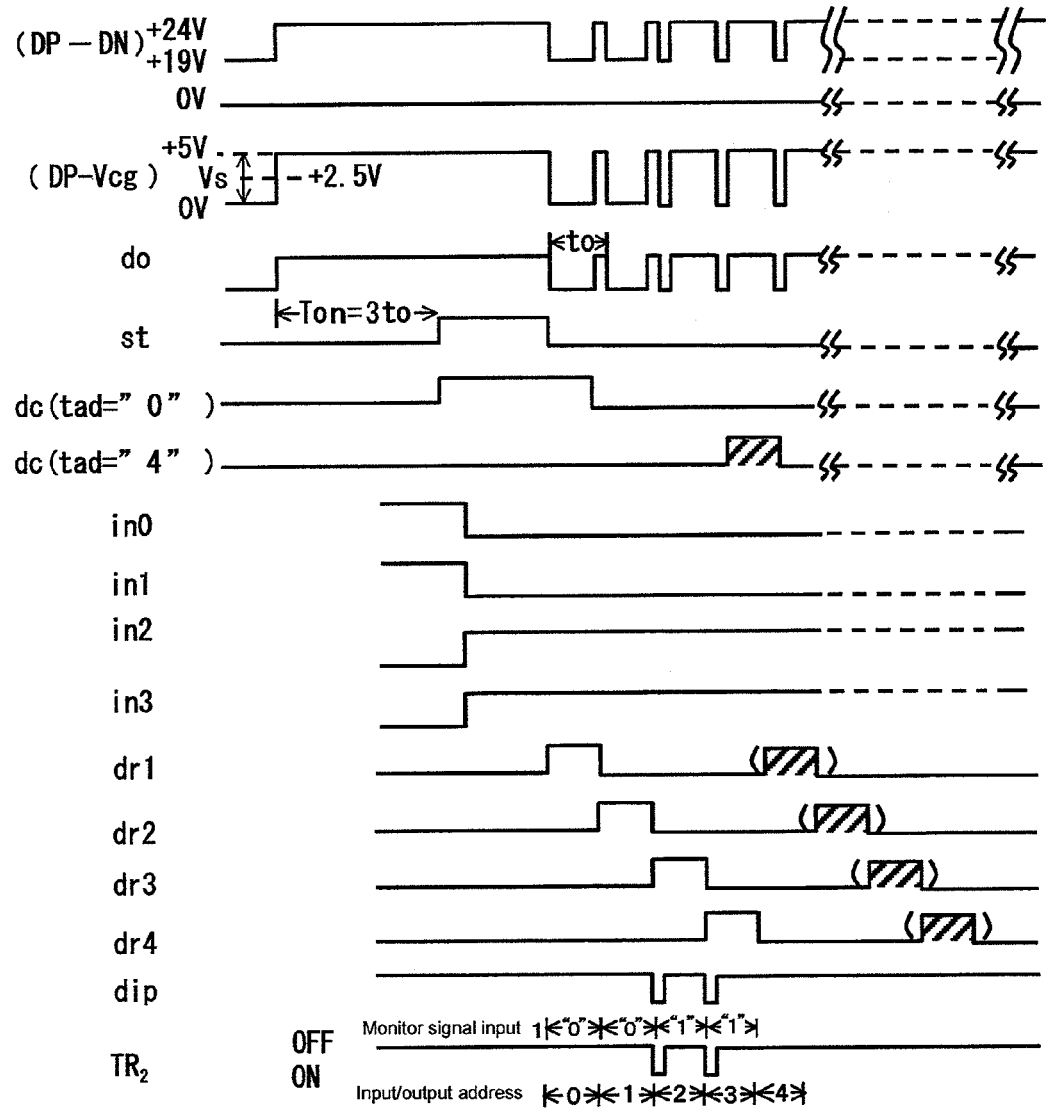
FIG. 9 is a time chart of the slave station input unit.
Figure 10:
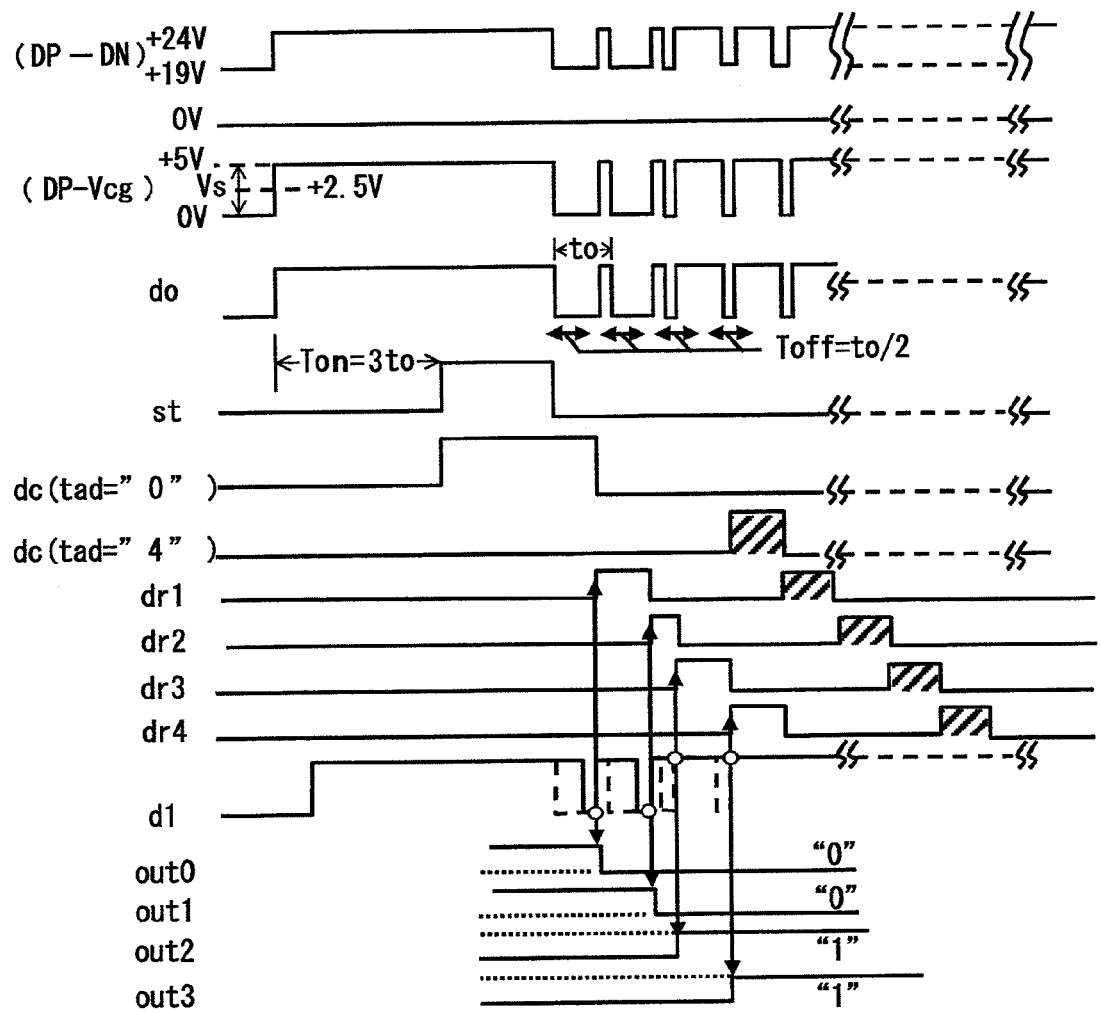
FIG. 10 is a time chart of the slave station output unit.
Figure 11:
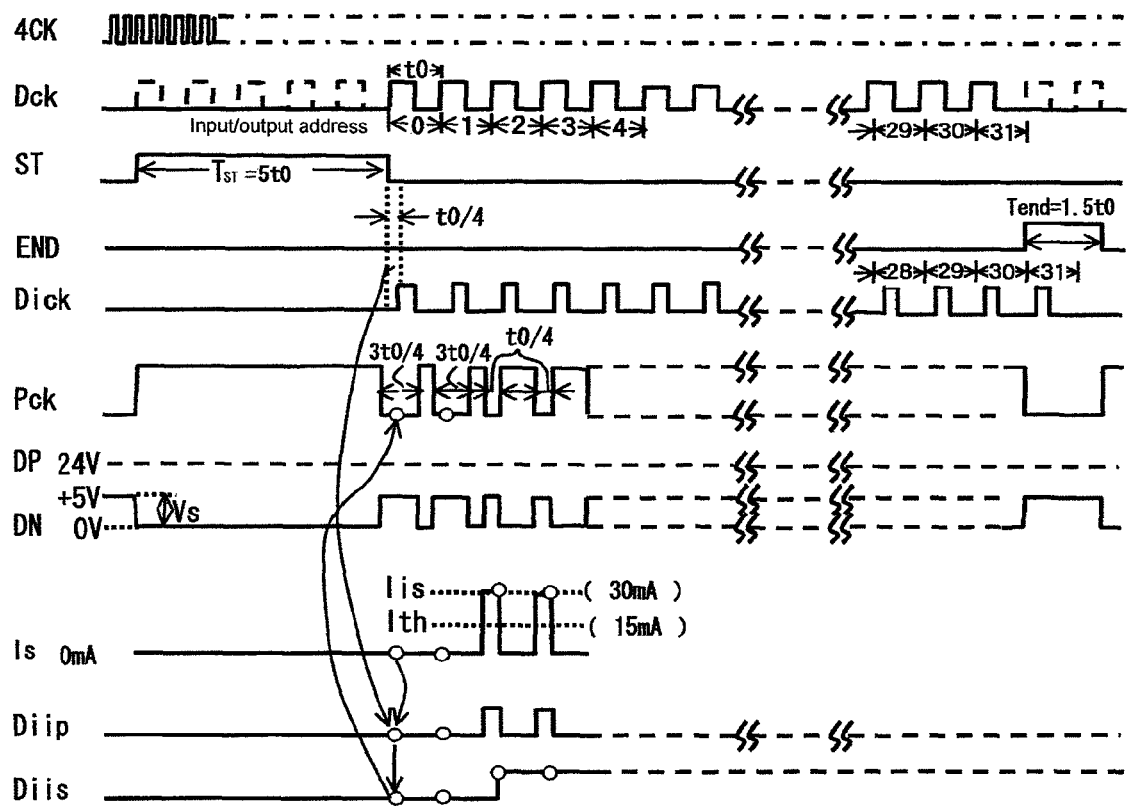
FIG. 11 is a time chart of the mediation station.

FIG. 4 is a functional block diagram of the slave station output unit, the slave station input unit and the actuating apparatus, FIG. 5 is a schematic functional block diagram of the slave station input unit, FIG. 6 is a schematic block diagram of the slave station output unit, FIG. 7 is a schematic functional block diagram of the mediation station, FIG. 8 is a time chart of the monitor/control signal transmission system, FIG. 9 is a time chart of the slave station input unit, FIG. 10 is a time chart of the slave station output unit, and FIG. 11 is a time chart of the mediation station. Since functions of the slave stations 4 do not depend on groups and are identical, in FIGS. 4 to 6, a distinction according to groups is not used, and DP is used to represent the signals DP1 and DP2, and DN is used to represent the signal lines DN1 and DN2.

First, the slave station input unit 3 will be described. The slave station input unit 3 includes a power source voltage generation unit (CV) 300, a line receiver 301, a control data signal extraction means 302, a slave station address setting means 303, an address extraction means 304, an input data unit 305, a monitor data signal generation means 306, and a line driver 307 as illustrated in FIGS. 4 and 5.

The power source voltage generation unit 300 is a DC-to-DC converter which generates power source voltages of a constant level for electrically driving a circuit which configures the corresponding slave station input unit 3 and for electrically driving the sensor unit 7 of the corresponding actuating apparatus 5, that is, an output Vcg(19V) and an output Vcp (24V), from the signal lines DP and DN. The stabilized output Vcg (19V) is obtained by smoothing and stabilizing voltages of the signal lines DP and DN through a well-known means, and the output Vcp (24V) is formed by a diode D0 and a condenser C0. A cycle of a clock, which is modulated in pulse width, of the signal lines DP and DN is set so that the output Vcp can sufficiently maintain 24V. The slave station input unit 3 operates between the output Vcg (19V) and the output Vcp.

The line receiver 301 includes division resistors R1 and R2 which are equal in resistance to each other and a buffer circuit B. An electric potential difference between the signal lines DP and DN, Vs, is detected, and a signal obtained by dividing the electric potential different by two through the division resistors R1 and R2 is output through the buffer circuit B. That is, when the electric potential difference between the signal lines DP and DN is 24V, the diode D0 is turned on by electric potential of 24V of the signal line DP, the condenser C0 is electrically charged to a corresponding electric potential difference, the output Vcp=24V is applied to one end of the resistor R1, and 24V of the signal line DP is applied to one end of the resistor R2. Therefore, there is no electric potential difference between both ends of the resistors R1 and R2. When the electric potential difference changes to 19V, the diode D0 is turned off, electric potential Vcp which is based on electric potential of the signal line DN maintains 24V through the condenser C0, but 19V of the signal line DP is applied to one end of the resistor R2. Therefore, an electric potential difference of 5V is applied between both ends of the resistors R1 and R2, and a value obtained by dividing the electric potential difference by two is applied to the buffer circuit B. Electric potential shifts in general, and a relationship between the output Vcp (24V) and the output Vcg (19V) which are reference potentials does not change.

As described above, in the circuit of the slave station input unit 3, it is equal to a case in which the condenser C0 is connected in parallel between the signal lines DP and DN, and the diode D0 is connected between a signal line DP side terminal of the condenser C0 and the signal line DP. Therefore, during a period in which an electric potential difference between the signal lines DP and DN is power source potential Vx=24V, a charging current flows from the signal line DP to the signal line DN through the diode D0 to electrically charge the condenser C0 and drive the circuit of the slave station 4 and the actuating apparatus 5. Meanwhile, during a period in which the electric potential difference "Vx−Vs" is 19V, the diode D0 is turned off, so that an electric current for electrically charging the condenser C0 does not flow (is blocked) from the signal line DP to the signal line DN. Therefore, during a period in which "Vx−Vs" is 19V, the condenser C0 is electrically discharged, so that circuits of the slave station 4 and the actuating apparatus 5 are driven, and when a monitor data signal is, for example, "1", a current signal is superimposed as will described later. That is, an electric current Iis in which a monitor data signal is "1" is output to the signal line DN.

In a control signal (a serial pulse voltage signal) onto which a clock CK is superimposed, the buffer circuit B outputs a high level when the electric potential difference is 24V and outputs a low level when the electrical potential difference is not 24V. It is an output do. That is, it is a data value of a demodulated control signal. It may be regarded as including a clock CK which is modulated in phase. The output do is input to a preset forward counter (hereinafter, referred to as a "preset forward counter 304") which is the address extraction means 304, and an inverted signal of the output do is input to a shift register SR. A waveform of the output do will be described later.

Before inputting a clock CK extracted, similarly, a start signal ST which is superimposed onto a control signal is detected as a high level of the output do and input to an on-delay timer Ton. Waveforms of the start signal ST and an output st will be described later, but the on-delay timer Ton delays by 3t0 (t0 means one cycle of a clock CK), that is, delays rising of the output st by 3t0 and synchronizes falling with the original signal ST. Therefore, in signals in which time of a high level is short, that is, in the clock CK and the end signal END which will be described later, the output st does not appear. The output st is input to a differentiating circuit, a differentiating signal is input to the preset forward counter 304 and the shift register SR at rising of the output st and used as a rest signal R. The output do is also input to the preset forward counter 304 and the shift register SR.

An address which is allocated to the corresponding slave station input unit 3 is set in a setting unit switch of the slave station address setting means 303. As the address, for example, when the corresponding slave station 4 is installed in the spot A described above (FIG. 1) and addresses 0 to 3 are allocated, the addresses are set. In FIG. 5, for simplicity, an address 0 is illustrated. The preset forward counter 304 is reset by a rising differentiating signal of the output st, and counts the extracted clock CK at rising thereof, and outputs an output dc of a waveform which will be described later while a count value is identical to an address of the setting unit switch. The address setting unit of the slave station illustrated here is a circuit example using a setting unit switch, but an address stored in a memory device controlled by a micro control unit (MCU) may be used.

The input data unit 305 stores one or plural (-bit) data values input from the corresponding sensor unit 7, and outputs one or plural data values stored to the monitor data signal generation means 306 in a predetermined order as a serial signal when the output dc is input from the preset forward counter 304. That is, the input data unit 305 performs parallel-to-serial conversion of a monitor signal. The monitor data signal generation means 306 outputs the monitor data signal corresponding to the data value of the monitor signal, and the monitor data signal which is output is output to the signal line DP and the signal line DN through the line driver 307 which is an output circuit.

The input data unit 305 further includes a shift register SR in the configuration. The shift register SR of the input data unit 305 shifts "1(or a high level)" in synchronization with falling of the extracted clock CK during a period in which the output dc has a high level. That is, in unit circuits Sr1 to Sr4 of the shift register SR, "1" is shifted in order. Therefore, outputs dr1 to dr4 of the shift register SR transition to a high level in order (until falling of the next cycle) in synchronization with falling in a cycle of a corresponding clock CK. The outputs dr1 to dr4 are input to four two-input AND gates, respectively.

An AND gate unit of the input data unit 305 includes two-input AND gates which are disposed in the same number (four in the case in which the addresses are 0 to 3) as allocated addresses (for example, the addresses 0 to 3 described above) and an OR gate which receives outputs of the AND gates. The outputs dr1 to dr4 of the shift register SR are input to the four AND gates, respectively. The outputs dr1 to dr4 transition to a high level in order (until falling of the next cycle) in synchronization with falling in a cycle of a corresponding clock CK as described above. Therefore, during a period in which the outputs dr1 to dr4 have a high level, the four AND gates are opened, and a monitor signal which has to be superimposed onto the addresses 0 to 3 (a signal based on an input of a signal "0" or "1" which depends on a state of the sensor unit 7 typically indicated in, for example, a switch SW0) is output from the OR gate through the AND gate in order.

An output of the OR gate is input to a two-input NAND gate 308. An output of an inverter INV, that is, an inverted signal of the output do, is input to the NAND gate 308. The NAND gate 308 configures the monitor data signal generation means 306. During a period in which a monitor signal of an address set in the setting unit switch is output, the NAND gate 308 is opened in synchronization with falling of the output do, and a monitor signal which employs a signal value depending on a state of the sensor unit 7, for example, "0011", is output as an output dip.

The output dip is output to the signal lines DP and DN after its level is converted through the line driver 307. The line driver 307 includes transistors T1 and T2, a diode D, and resistors R3, R4 and Ris. The output dip is input to the large transistor T2 through the transistor T1. That is, when a monitor data signal is, for example, "1", the transistor T2 is turned on by the output dip of a low level, so that an electric current Iis which is a monitor data signal flows to a DP signal line 8 and a DN signal line 9. Therefore, the current signal Iis which a monitor data signal is "1" is superimposed onto the signal line DN signal line 9. An electric current flowing through the transistor T2 is restricted by appropriately selecting the resistors R3, R4 and Ris. The electric current may be restricted to 30 mA (milliampere).

As can be understood from the above description, a monitor signal is output to (superimposed onto) the signal lines DP and DN as a current signal from the slave station input unit 3 in one cycle of the signal do which is a clock signal (extracted). At this time, as described above, during a period in which an electric potential difference (Vx–Vs) between the signal lines DP and DN is 19V, the diode D0 is turned off, so that an electric current for electrically charging the condenser C0 does not flow from the signal line DP to the signal line DN. Therefore, a collision between a charging current from the mediation station 1 and a monitor data signal does not occur, and a monitor data signal is superimposed onto a data value of a control signal which is output to the signal lines DP and DN at that point of time. That is, a monitor data signal is superimposed onto a data location of a serial pulse voltage signal corresponding to the corresponding slave station 4. That is, since data of a monitor signal of the same address is superimposed onto a control signal of the same address, an address (an input address) of a monitor signal becomes identical in transmission cycle to an address (an output address) of a control signal.

An example of the slave station illustrated here is a circuit example using individual circuit components, but the same signal processing may be performed by a MCU.

Next, a circuit configuration of the slave station output unit 2 will be described. The slave station output unit 2 includes a power source voltage generation unit (CV) 200, a line receiver 201, a control data signal extraction means 202, a slave station address setting means 203, an address extraction means 204, and an output data unit 205 as illustrated to FIGS. 4 and 6. The power source voltage generation unit (CV) 200, the line receiver 201, the control data signal extraction means 202, the slave station address setting means 203, and the address extraction means 204 are almost identical in configuration to the power source voltage generation unit 300, the line receiver 301, the control data signal extraction means 302, the slave station address setting means 303, and the address extraction means 304 of the slave station input unit 3 described above and thus will be briefly described below. For example, the slave station output unit 2 of the spot B is identical in allocatable address (that is, the addresses 0 to 3 in this case) to the slave station input unit 3 of the spot A. Monitor signal data of the same number (4) as the data number of an extracted control signal are input.

The power source voltage generation unit (CV) 200 generates a power source voltage of a constant level from a signal line similarly to the power source voltage generation unit 300 of the slave station input unit 3. That is, stabilized outputs Vcg (19V) and Vcp (24V) are obtained by smoothing and stabilizing voltages of the signal lines DP and DN through a well-known means. The output Vcg (19V) corresponds to a power source voltage of 5V (corresponding to Vcc) relative to the output Vcp (24V) when the output Vcp (24V) is used as a reference voltage. The power source voltage is used to electrically drive a low power consumption circuit (for example, an LED display circuit) pertaining to the corresponding slave station output unit 2 and electrically drive the actuator unit 6 of the corresponding actuating apparatus 4. That is, even though not illustrated, the power source voltage generation unit 200 supplies the actuator unit 5 with electric power. When driving power of the actuator unit 6 is large, a separate local power source may be used.

The line receiver 201 which is an input circuit obtains a signal transmitted through the signal lines DP and DN and outputs the signal to the signal extraction unit 202. The control data signal extraction means 202 extracts a control data signal from the signal and outputs the extracted control signal to the address extraction means 204 and the output data unit 205. The slave station address setting means 203 stores its own slave station address which is allocated to the corresponding slave station output unit 2. The address extraction means 204 extracts an address which is identical to its own slave station address stored in the slave station address setting means 203, and outputs the extracted address to the output data unit 205. The output unit 205 outputs one or plural data values, at timing in which addresses are identical, among (serial) data signals transmitted from the signal lines DP and DN to the corresponding actuator unit 6 as parallel signals when an address is input from the address extraction means 204. That is, the output data unit 205 performs serial-to-parallel conversion of a control signal.

The line receiver 201 includes a buffer circuit B similarly to the line receiver 301 of the slave station input unit 3 and outputs a signal do whose level is converted according to an electric potential difference with the signal lines DP and DN. The signal do is input to an on-delay timer Ton and an off-delay timer Toff. The off-delay timer Toff outputs with a predetermined delay during an off period (a low level). That is, falling of the input do is delayed, and rising is synchronized with the original input do. A corresponding delay is t0/2 (t0 means one cycle of a clock CK). A waveform of a signal d1 will be described later, but due to the signal d1, an output corresponding to a data value ("0" or "1") of a control data signal is done. The on-delay timer Ton is identical to that of the slave station input unit 3, and a description on that is omitted.

Outputs dr1 to dr4 of the shift register 204 are different from those of the slave station input unit 3, and transition to a high level in order (until rising of the next cycle) in synchronization with rising in a cycle of a corresponding clock CK. The outputs dr1 to dr4 are input to D-type flip-flop circuits FF1 to FF4 which configure the output data unit 205 as a clock, respectively. The output d1 (that is, a data value of a demodulated control signal) is also input to the flip-flops FF1 to FF4. For example, the flip-flop circuit FF1 obtains and stores a value of the output d1 at that moment in synchronization with rising of the output dr1 and outputs it as a signal out0. Similarly, the other flip-flop circuits FF2 to FF4 obtain and store values of the output d1 at that moment in synchronization with the outputs dr2 to dr4, and output them as signals out1 to out3.

The outputs out0 to out3 are inverted, respectively, and then output to the actuator unit 6 of the actuating apparatus 5 as outputs O0 to O3 through large driving transistors T0 to T3 whose emitters are connected to a condenser C0 in order to control, for example, a load L0. As described above, electric power for the load L0 is supplied from the slave station output unit 2. When driving power of the load L0 is large, a separate local power source may be used.

Next, the mediation station input unit 18 will be described. A monitor signal output to the signal lines DP1 and DN1 or the signal lines DP2 and DN2 is input to and detected by the monitor signal detection means 19 of the mediation station input unit 18, and the detection signal is inverted, and the inverted detection signal is output as an output Diip. A waveform of the output Diip includes (only) a monitor data signal. In the output Diip, data of a monitor signal corresponding to an address location of data of a monitor signal exists at an address location which is delayed by one from an address location of a data of a corresponding control signal.

The monitor signal detection means 19 includes a transistor Ti, a zener diodes ZD1 and ZD2, and resistors R1, R2 and Ri as a current detection circuit which detects and outputs a current change of the signal lines DP1 and DN1 or the signal lines DP2 and DN2. An amplitude is limited to 5V=Vs due to the zener diode ZD1 with a breakdown voltage of 4.5V and the resistor R1. That is, during a period in which an electric potential difference (Vx−Vs) between the signal lines DP1 and DN1 or the signal lines DP2 and DN2 is 19V, an electric current for electrically charging the condenser C0 does not flow from the signal line DP1 to DN1 or from the signal line DP2 to DN2, and a detection current Is flows to the monitor signal detection means 19. At this time, when a monitor data signal is "1", an electric current Iis is superimposed. Therefore, as the detection current Is of the monitor data signal, the electric current Iis=30 mA flows. The transistor Ti detects the electric current Is. The zener diode ZD2 is broken down when an electric current equal to or more than 15 mA flows. It is a threshold value Ith for detecting the electric current Is. Therefore, the transistor Ti is turned on by the detection current Is=30 mA by the monitor data signal "1". When the monitor data signal is "0", since the electric current Iis does not flow, the detection current Is of the monitor data signal does not flow. Therefore, the zener diode ZD2 is not broken down, and the transistor Ti is turned off by the monitor data signal "0".

The detection current Is (=30 mA) which is the monitor data signal "1" is converted to a voltage signal by a voltage drop of the collector resistor Ri and then input to the monitor data extraction means 20. Based on the detection current Is, the output Diip is formed by the inverter INV and input to a RS flip-flop FF of the monitor data extraction means 1310. An output Diis of the flip-flop FF is input to the control data signal generation means 14 of a different group.

The control data signal generation means 14 outputs a signal of two values (a high level of 5V and a low level of 0V) to one signal line Pck. A signal output to the signal line Pck is output to the signal lines DP1 and DN1 or the signal lines DP2 and DN2 through the line driver 23. The line driver 23 is configured by a large transistor Td for supplying a charging current of the condenser C0 and can perform low impedance driving. An output amplitude is limited to 0V to 5V due to the zener diode ZD1 (a breakdown voltage of 4.5V) and outputs an inverted signal of the signal line Pck to the signal line DN1 or DN2. The signal lines DP1 and DP2 are supplied with power source potential Vx=24V. Therefore, a signal between the signal lines DP1 and DN1 or the signal lines DP2 and DN2 is a two-value (a level Vx and a low level of high potential) signal. A start signal ST which will be described later is output as a signal of a power source potential Vx level, and an end signal END is output as a signal of a low level of high potential.

Next, input/output waveforms of the mediation station 1 will be described.

A signal Dck illustrated in FIG. 11 is a clock CK (a signal in which an oscillation output from the oscillator (OSC) 11 of the mediation station 1 is divided and generated in a predetermined cycle), starts to be output subsequent to the start signal ST in synchronization with falling of the start signal ST, and are output by a predetermined number (the number of addresses). An example of the mediation station illustrated here is a circuit example using individual circuit components, but the same signal processing may be performed by a MCU.

In this embodiment, since a control signal which has to be distributed to a plurality of slave stations 4 is transmitted to a signal line from one mediation station 1 as a serial signal (a serial pulse voltage signal), an address count method is used as a distribution means. That is, a total of the number of data of a control data signal which has to be transmitted (distributed) to the slave station 4 is previously known. Therefore, one address is allocated each data of an overall data signal. Here, the number of addresses is not limited and may be 0 to 32, 0 to 63, 127, 255, . . . . For example, when the addresses 0 to 31 are used, a 32-bit control signal is output.

As described above, the slave station 4 extracts a clock CK from a serial pulse voltage signal and counts the number, and obtains data values of a serial pulse voltage signal at that moment as a control signal in the case of (one or plural) addresses allocated to data of a control data signal which its own station has to receive. A final address is also allocated to the mediation station 1 in order to form an end signal which will be described later.

The start signal ST and the end signal END are formed in order to determine a start and an end for counting the address, respectively. The start signal ST and the end signal END are output by the timing generation means 13 of the mediation station 1. That is, before output of a serial pulse voltage signal, the start signal is formed, so that the start signal ST is output to the signal line DP1 or DP2, and when an address which is previously allocated to itself is extracted by counting a clock CK extracted from a serial pulse voltage signal, the end signal END is output to the signal line DP1 or DP2. To this end, the timing generation means 13 includes a count means which is not illustrated.

The count means starts a count at rising of the start signal ST. When a count output of the count means has a predetermined value, an output of the clock CK is stopped. A predetermined number (the number of addresses) of clocks CK are detected, and the end signal END is subsequently output. The start signal ST is output again in synchronization with ending of the end signal END, and the same operation is repeated. A value corresponding to the number of data transmitted during a transmission period of one time (from one start signal ST to a subsequent end signal END) is a maximum value of the address. For example, in the case of a 32-bit control signal, 31 which is a maximum address count value becomes an address of the mediation station, and the end signal END is output according to completion of data processing of the 31-th address of the control signal.

The start signal ST is a signal longer than one cycle t0 of a clock CK to be discriminated from a control signal, and the end signal is a signal which is longer than one cycle t0 of the clock CK and shorter than the start signal. In this embodiment, the start signal ST is a signal of 24V (a high level) output during a period of 5t0. Meanwhile, the end signal END is a signal of a high level output during a period of 1.5t0.

Since the start signal ST and the end signal END are definitions of signals, they may be discriminated by particular data. Even though not illustrated, in the case of a 4-bit address, 1111 data may be defined as the start signal ST which is start data, and 1110 data may be defined as the end signal END which is end data.

In this embodiment, for a data signal, when a case in which a first ¾ cycle (3t0/4) of one cycle of the clock CK is 19V (in a concrete embodiment, there is a case in which "a low level of high potential" is referred to as simply "a low level") and a final ¼ cycle (t0/4) is a high level and a case in which a first 1/4 cycle (t0/4) is a low level and a final ¾ cycle (3t0/4) is a high level are combined, the former is a value "0", and the latter is a value "1". An address (an input address) is allocated for each data value (one cycle (t0) of the clock CK). For example, in FIG. 11, when a data value of the signal Pck output from the control data generation means 14 is "0011", in an address (0 and 1) in which a data value becomes "0", a first ¾ cycle of a corresponding clock becomes a low level, and a final ¼ cycle of a corresponding clock becomes a level of a power source voltage Vx (a high level). In an address (2 and 3) in which a data value becomes "1", a first ¼ cycle of a corresponding clock becomes a low level, and a final ¾ cycle of a corresponding clock becomes a high level. That is, a duty ratio of a clock changes depending on a data value of a control data signal. Therefore, in output for the actuator unit 6, a control data signal which has to be parallel is output to the signal lines DP1 and DN1 or the signal lines DP2 and DN2 as a serial pulse voltage signal.

A width (a pulse width of a pulse width modulation) of a low level of a data signal may be variously selected. For example, on the contrary to the above-described example, a pulse width may be reduced (to t0/4) in the case of a data value "0", and a pulse width may be increased to (3t0/4) in the case of a data value "1".

A signal of an output Dick becomes a detection trigger. The mediation station input unit 18 detects a monitor data signal which is superimposed onto a serial pulse voltage signal transmitted through a signal line as presence or absence of the current signal Iis in every one cycle of a clock CK under control of a timing signal. Therefore, a signal of an output Dick which is the detection trigger is formed in the timing generation means 13. A signal of the output Dick is a pulse whose rising is delayed by ¼ cycle (t0/4) from a clock CK. Therefore, each data value of a serial monitor signal is extracted, converted into a monitor signal, and then input to the control data signal generation unit 20 which is connected to a different group. That is, at timing of rising of the output Dick, that is, at timing in which t0/4 elapses in one cycle of each of a clock CK, presence or absence (on/off) of a monitor signal is detected. At corresponding timing, when the current Iis which is a monitor signal is smaller than Ith, it is OFF or "0" (of a two-value signal), while when the current Iis is larger than Ith, it is ON or "1" (of a two-value signal). Ith is a threshold current of the monitor signal detection means 19, and Iis is a monitor data signal. Ith is a value smaller than Iis.

Therefore, for example, when a data value of a monitor data signal is "0011", an output (the detection current Is) of the monitor signal detection means 19 becomes a signal of a state in which the current Iis is larger than Ith in a first t0/4 cycle in an address (2 and 3) having a data value "1" as illustrated in FIG. 11.

At corresponding timing, that is, at timing in which t0/4 elapses in one cycle of each of a clock CK, when a monitor signal is OFF, a pulse width (a period of "a low level", that is, 19V) of an output signal (therefore, an output signal for the signal lines DP1 and DN1 or the signal lines DP2 and DN2) of the signal line Pck is increased, that is, a remaining period of a corresponding cycle also becomes "a low level", so that a pulse width becomes 3t0/4. Meanwhile, at corresponding timing, when a monitor signal is ON (Iis is equal to or more than 25 mA), a pulse width is reduced, that is, a remaining period of a corresponding cycle becomes power voltage potential Vx (a high level), so that a pulse width becomes t0/4, and a pulse width modulation of the control signal Pck is performed.

The output Diis is monitor data output from the RS flip-flop FF of the monitor data extraction means 20. In the flip-flop FF, a signal (a pulse whose rising is delayed by a ¼ cycle (t0/4) from a clock CK) of the output Dick is input from the timing generation means 13 as the clock. Therefore, the output Diis of the flip-flop FF outputs a value of only a monitor data signal at timing which is delayed by a ¼ cycle from an original clock during a period equal to a ¾ cycle of a clock CK. That is, the output Diis becomes a high level (or "1") or a low level (or "0") in every one clock according to a data value of a monitor signal. Therefore, the output Diis is output like, for example, "0011 . . . ".

A clock 4CK is generated in the timing generation means 13 by dividing an oscillation output of the oscillator 11, and has a frequency of four times (4f0) compared to a frequency f0 of a clock CK. The control data signal generation means 14 counts the clock 4CK through a counter which is not illustrated, and outputs "a low level of high potential" in a cycle of first one clock 4K and a high level Vx in cycles of the remaining three clocks 4CK when a value of a control signal (a signal of the output Diis) is "1". On the contrary, when the value is "0", "a low level of high potential" is output in cycles (3t0/4) of first three clocks 4CK, and a high level Vx is output in a cycle of the remaining one clock 4CK. Therefore, the control data signal generation means 14 (PWM) modulates a clock CK based on a control signal.

Next, waveforms of the slave station input unit 3 will be described.

A signal waveform of the output do from the buffer circuit B of the line receiver 301 is a waveform of a clock CK which is (PWM) modulated based on a control signal (DP-DN) as illustrated in FIG. 9. A high level signal value of the output do is 5V.

Since the output st is output from the on-delay timer Ton, rising is delayed by 3t0 from rising of the start signal ST, and falling is synchronized with the start signal ST. For the start signal ST in which a period of a high level is longer than 3t0, the output st appears, but for a signal in which a period of a high level is short, that is, for the clock CK and the end signal END, the output st does not appear. Therefore, the start signal ST can be detected.

Since the output dc is output from the preset forward counter 304, the output do, that is, an extracted clock CK is counted at rising thereof and output while a count value coincides with an address value of the setting unit switch. The waveform has a high level in synchronization with rising of a clock CK in a cycle of a most recent previous address, and has a low level in synchronization with rising of a clock CK in a cycle of a corresponding address as illustrated in FIG. 9. For example, for an address 0 (tad=0), it becomes a high level in synchronization with rising of the output st of the start signal ST which becomes a most recent previous address, and becomes a low level in synchronization with rising (3t0/4) in a cycle of a corresponding address. When an address is 4 (tad=4), it is hatched for reference. The output dc is input to the shift register of the input data unit 305.

Since the outputs dr1 to dr4 are output from the shift register SR of the input data unit 305, they are those in which "1" (or a high level) is shifted in synchronization with falling of an extracted clock CK during a period the output dc has a high level. That is, "1" is shifted in the unit circuits Sr1 to Sr4 of the shift register SR in order. Therefore, the outputs dr1 to dr4 of the shift register SR become a high level in order (until falling of the next cycle) in synchronization with falling of the clock CK in a cycle of a corresponding clock CK. It can be understood that in waveforms of the outputs dr1 to dr4 illustrated in FIG. 9, timings thereof are deviated by one clock. Similarly to the output dc, when an address is 4 (tad=4), they are hatched for reference.

Since outputs in0 to in3 are output from the sensor unit 7, in an embodiment illustrated in FIG. 9, monitor signals of a sensor to which the addresses 0 to 3 are imparted is "0", "0", "1", and "1". The outputs in0 to in3 are input to the four AND gates together with the outputs dr1 to dr4, respectively, and employs a value "0011" illustrated in FIG. 9 during a period in which the outputs dr1 to dr4 have a high level. Therefore, during a period in which a monitor signal (the addresses 0 to 3) "1" is output, the four AND gates are opened, respectively, and they are output from the OR gate through the AND gates in order as a monitor signal which has to be superimposed onto the addresses 0 to 3.

The output dip is output from the ANDN gate 308 of the monitor data signal generation means 306. The NAND gate 308 receives an output of the inverter INV, that is, an inverted signal of the output do, and an output signal of the OR gate as described above. During a period in which a monitor signal "1" of an address set in the setting unit switch is being output, the NAND gate 308 is opened in synchronization with falling of the output do, so that the output dip is output as a monitor signal employing values identical to the outputs in0 to in3.

TR2 is a time chart for illustrating an on-off state of the transistor TR2 based on a relationship with the output dip. The output dip is input to the large transistor T2 through the transistor T1. That is, when a monitor data signal is, for example, "1", the transistor T2 is turned on by the output dip of a low level, so that the electric current Iis which is a monitor data signal flows to the DP signal line 8 and the DN signal line 9.

Next, output waveforms of the slave station output unit 2 will be described. As described above, since part of a configuration of the slave station output unit 2 is identical to that of the slave station input unit 3, signals which are transmitted and received through the components are identical to those of the slave station output unit 2. Therefore, among output waveforms illustrated in FIG. 10, a description on the same waveforms as in the slave station output unit 3 is omitted.

The output d1 is output from the off-delay timer Toff. The off-delay timer Toff outputs with a predetermined delay (in this embodiment, t0/2) only during an OFF period (a low level). The signal d1 is obtained by inputting the output do from the buffer circuit of the line receiver 301 to the off-delay timer Toff, delaying falling thereof, and synchronizing rising thereof with the original input do. That is, when a data value of the input do is "1", "a low level of high potential" of a first ¼ cycle of a corresponding clock does not appear (a high level is maintained "as is") since an OFF period thereof is short. Also, in the case of "0", "a low level of high potential" of a first ¾ cycle of a corresponding clock appears by a (²⁄₄−½)=¼ cycle in the signal d1 since an OFF period thereof is long.

Since the outputs dr1 to dr4 are output from the shift register SR of the input data unit 205, unlike those of the slave station input unit 3, the outputs dr1 to dr4 become a high level in order (until rising of the next period) in synchronization with rising of the clock CK in a cycle of the clock CK.

The outputs out0 to out3 are a control signal of the addresses 0 to 3 and are those which are modulated by the flip-flop circuit FF1 to FF4 which configure the output data unit 205. As described above, the flip-flop circuits FF1 to FF4 obtain and store values of the signal d1 at that moment in synchronization with rising of the output dr1 to dr4, and output them as the outputs out0 to out3. Therefore, in this embodiment, data values of the outputs out0 to out3 are "0", "0", "1", and "1", respectively. The outputs out0 to out3 are inverted, respectively, and are then output to the actuator unit 6 of the actuating apparatus 5 through the large driving transistors T0 to T3 whose emitters are connected to the condenser C0 as the outputs O0 to O3.

As a result of performing input/output of a signal described above in each configuration, a signal which is transmitted from and received by the mediation station 1 is as follows. FIG. 8 illustrates a case in which data values of the addresses 0 to 3 of a control signal output from the mediation station 1 are "0101" in the group P1 and "0011" in the group P2, and an input from the sensor unit 7 to which the addresses 0 to 3 are imparted is "0011" in the group P1 and "0101" in the group P2.

In this embodiment, in a serial pulse voltage signal, one cycle (t0) of a clock CK, that is, each address, is divided into at least an input period (i) and an output period (o) subsequent thereto. In FIG. 8, in the addresses 0 and 2 of the control signal of the group p1 and the addresses 0 and 1 of the control signal of the group P2 in which a data value becomes "0", a first ¾ cycle which is a low level is an input period, and the remaining ¼ cycle is an output period. Also, in the addresses 1 and 3 of the control signal of the group p1 and the addresses 2 and 3 of the control signal of the group P2 in which a data value becomes "1", a first ¼ cycle is an input period, and the remaining ¾ cycle is an output period. During an input period, a monitor data signal including the current signal Is is superimposed, and the mediation station input unit 18 extracts the superimposed monitor data signal. Meanwhile, during an output period, a control signal which is pulse width modulated (PWM) is superimposed. The mediation station output unit 15 determines the monitor signal obtained from each group as monitor data "0" or "1" at a point of time t0/4, pulse width modulates (PWM) as a control signal of a different group, and superimposes a control data signal onto a serial pulse voltage signal and outputs the superimposed signal to the a signal line of a different group during an output period thereof. In the embodiment of FIG. 8, a monitor signal "0011" obtained from the group P1 is transmitted to the signal lines DP2 and DN2 of the group P2 as a control data signal, and a monitor signal "0101" obtained from the group P2 is transmitted to the signal lines DP1 and DN1 of the group P1 as a control data signal.

As can be seen from above, in the control/monitor signal transmission system, a plurality of actuating apparatuses 5 are divided into one or plural sets including at least two, and actuating apparatuses which belong to the same set but are different in a group of a connected signal line are regarded as having a correspondence relationship, and so a monitor signal from an actuating apparatus 5 of a predetermined group is transmitted as control data for a corresponding actuating apparatus of a different group through the mediation station 1. Therefore, a simple configuration in which a conventional control unit and a master unit are omitted can be realized, leading to easy maintenance and low cost. For each input/output address of a transmission cycle, an output signal including a pulse width modulation signal is controlled by an input signal including a current signal. Therefore, virtual two-way transmission of an input signal and an output signal (actually, as will be described later, a transmission moment is not bi-directional) can be performed, and a power line can be omitted.

As described above, a current signal is used as a monitor signal, and a voltage signal which is modulated in pulse width is used as a control signal (a combination of a current modulation monitor signal and a pulse width modulation control signal), so that a transmission control system of high reliability can be realized in manufacturing factories under an unfavorable condition in which a voltage noise is large.

In this embodiment, a control signal includes a pulse voltage of a power source voltage Vx, that is, 24V level and a pulse voltage of "a low level of high potential" which is a level smaller (in absolute value) than the power source voltage and larger (in absolute value) than a high level signal of a different circuit portion as described above. Therefore, it is sufficiently larger than a CMOS high level signal 5V of a different circuit portion (for example, a CMOS logic circuit portion) Since an electric potential difference Vs of a clock CK, that is, between a high level and a low level of a pulse voltage, is 5V, by using a threshold value as an intermediate value thereof (21.5V when a DN signal line 9 is used as a reference level), they can be sufficiently discriminated. That is, an electric potential difference Vs is equal to a CMOS logic amplitude of a different circuit portion (for example, a CMOS logic circuit portion). Therefore, a serial pulse voltage signal may be regarded as a signal obtained by level-shifting a clock of the electric potential difference Vs "as is" and modulating a pulse width thereof according to a control data signal. Meanwhile, according to a clock which is modulated in pulse width and is limited in amplitude at high potential, an average power source voltage realized by transmitted average power becomes too high, that is, +21.5V which is about a center value of a corresponding amplitude as indicated by a dashed line in FIG. 8. Therefore, even though, for example, a power line P is omitted, power capacity enough for operating each of a plurality of slave stations 4 can be transmitted.

There are two means for converting a serial pulse voltage signal of the signal lines DP1 and DN1 or the signal lines DP2 and DN2 as described above. According to a first means, electric potential of the signal line DP1 or DP2 (hereinafter, referred to as "DP" in this description) is fluctuated between a power source voltage Vx=24V which is highest potential and 19V which is "a low level of high potential" according to a value of a control data signal to make electric potential of the signal line DN1 or DN2 (hereinafter, referred to as "DN" in this description) become a grand level. Also, electric potential of the signal line DP may be fluctuated between 0V and −5V to make electric potential of the signal line DN becomes −24V which is lowest potential. In a second means, according to a value of a control data signal, electric potential of the signal line DP becomes a grand level, and electrical potential of the signal line DN is fluctuated between a power source voltage Vx=−24V which is lowest potential and −19V which is a low level of high potential (which has a large absolute value). +24V which is highest potential may be used as electric potential of the signal line DP, and electric potential of the signal line DN may be fluctuated between +5V and 0V. The waveforms of FIG. 11 accord with this example. Even in any case, an above-described relative potential difference between the signal lines DP and DN is generated.

When average power transmitted by a clock CK is low, the power line P cannot be omitted. For example, as a method which has been used until now, there is a method in which 24V is equally used as the power source voltage Vx and an amplitude that a control signal is amplitude modulated has two values of 12V and 0V. However, an average power source voltage realized by average power transmitted by a clock is equal to or less than 12V, that is, a low value. Therefore, in this case, when the power line P is omitted, it is difficult to operate all of slave stations 4, and the number of slave stations 4 had to be limited. However, since it is not realistic, the number of slave stations is actually not limited, and the power line P had to be installed.

Embodiments of the present invention have been described hereinbefore, but the present invention can be variously modified within the scope of its main purpose.

Figure 12A:
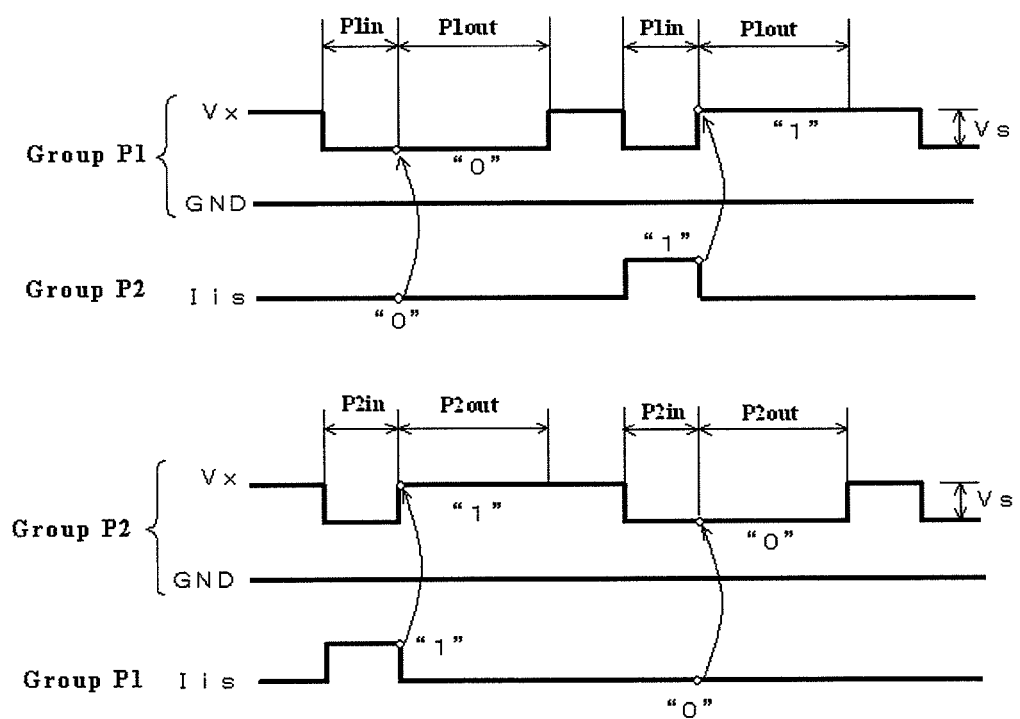
FIGS. 12A and 12B are time charts of signal transmitted to a signal line.
Figure 12B:
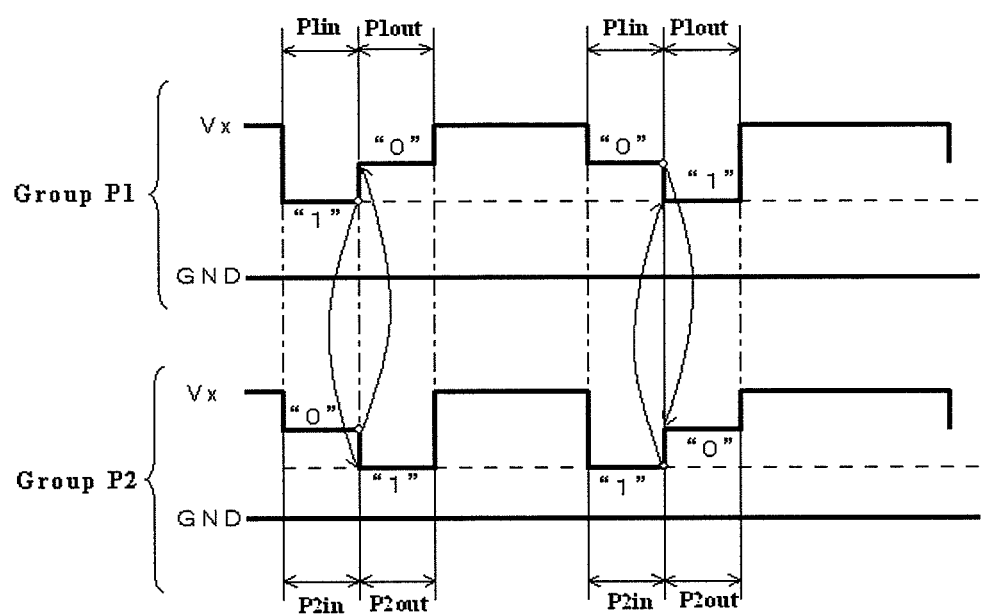

For example, based on a concept in which every one cycle of a clock CK (in the same cycle) is conceptually divided into a first half portion (an input period, in) and a second half portion (an output period, out), and an input period is used to input a monitor signal, and an output period is used to input a control signal, more various modifications can be made. As illustrated in FIG. 12(*a*), in the embodiment described above, a signal transmitted to a signal line has two levels of a high level and a low level as a voltage level, and a first ¼ of one clock is used as an input period, and a final ⅔ or ¾ is used as an output period. A monitor signal is represented by presence or absence of an electric current of an input period, and a control signal is represented by a pulse width of an output period. In this method, for example, as illustrated in FIG. 12(b), a separate level (hereinafter, referred to as an "intermediate level") exists between a high level and a low level in addition to a high level and a low level as a voltage level of a signal, and a high level may be used to discriminate an address of a signal, and an intermediate level and a low level may be used to a data value. In this case, when a first ¼ of one clock is used as an input period and a final ½ is used as an output period, a monitor signal is represented by a voltage level of the input period, and a control signal is represented by a voltage level of the output period. As indicated by an arrow line in FIG. 12, a monitor signal obtained from each group is reflected in a corresponding control signal of a different group.

When in the same cycle of a clock CK, an input period in and an output period out are conceptually discriminated, in the control/monitor signal transmission system of the present invention, a control signal for the slave station output unit 2 of an output period becomes ON or OFF according to ON or OFF of a monitor signal from the slave station input unit 3 of an input period. Therefore, an input period precedes not to overlap, and an output period subsequently follows, and a monitor signal and a control signal are apparently bi-directionally transmitted in one cycle of a clock CK but actually transmitted separately in an input period and an output period. An input period and an output period may not be a t0/2, and may not have the same time length.

That is, the mediation station input unit 18 extracts a monitor data signal superimposed onto a signal transmitted through the signal lines DP1 and DN1 or the signal lines DP2 and DN2 during an input period (in) in every one cycle of a clock CK when a corresponding cycle is divided into at least an input period and an output period subsequent thereto. Meanwhile, the mediation station output unit 15 obtains a monitor signal as a control signal, and superimposes a control data signal onto a serial pulse voltage signal and outputs the superimposed control data signal to the signal lines (DP1 and DN1 or DP2 and DN2) of a different group during an output period (out) in every one cycle of a clock CK.

A monitor signal is not limited to an electric current, and a voltage signal may be used as illustrated in FIG. 12(b). When a voltage signal is used, it may be represented by a magnitude of a pulse width as well as a voltage level. It is the same for a control signal, it may be any of an electric current signal and a voltage signal, and when it is a voltage signal, it may be represented by a magnitude of a pulse width as well as a voltage level.

In the system, an appropriate additional apparatus may be installed. For example, an error check circuit may be installed in the mediation station 1. The error check circuit monitors the DP signal line 8 and checks a line state (for example, a short circuit). The error check circuit may have, for example, a configuration disclosed in Japanese Patent Application Laid-Open (JP-A) No. 03-006997.

Also, even though not illustrated, operation of the mediation station 1 and the slave station 4 may be performed by executing a corresponding processing program which executes each processing described above in a CPU (central processing unit) installed in each of them.

The present invention can be preferably used as a transmission system in the case in which a distance between controlled apparatuses which are dispersedly arranged is long.

Also, according to the present invention, in the control/monitor signal transmission system, a mediation station is installed in place of a control unit and a master station which performs determination when communication control is performed, and an advantage of a conventional system can be also realized "as is". That is, simple communication control can be performed without a control unit, and the same cycle of a clock in which a monitor signal from a sensor unit is transmitted as a control signal for an actuator unit is divided into an input period and an output period subsequent thereto, and a monitor signal from a sensor unit and a control signal for an actuator unit are superimposed and transmitted during an input period and an output period, respectively, and electric power is also superimposed, so that a power line is not necessary.

Therefore, a control/monitor signal transmission system which substitutes for a control unit and a master station and is simple, small-sized, easy in maintenance and, low in price can be realized, and in addition, in a corresponding system, virtual two-way high-speed signal transmission between an actuator unit and a sensor unit can be realized, and a monitor signal and a control signal can be output to a common data signal line and can be bi-directionally transmitted. That is, in a control/monitor signal transmission system which is simple and small-sized, easy in maintenance and low in price, a period of transmitting a monitor signal or a control signal through a data signal line does not need to be separately set up, so that a transmission rate can be increased twice compared to the conventional art, and a monitor signal and a control signal can be transmitted even in a small wiring space of an actuating apparatus.

EFFECT OF THE INVENTION

In the present invention, since a data signal line includes a plurality of independent groups which are consolidated to a mediation station, a distance of each group is used as a wiring allowable distance up to now, so that it is possible to make a wiring allowable distance of an overall system longer than a conventional system. In addition, a plurality of actuating apparatuses are divided into one or plural sets including at least two, and the actuating apparatuses which belong to the same set and are different in group of a connected data signal line are regarded as having a correspondence relationship. Therefore, monitor data from an actuating apparatus of a predetermined group is transmitted as a control data to a corresponding actuating apparatus of a different group through a mediation station. Therefore, simple communication control can be performed without requiring a control unit.

In the present invention, there is also an effect of a conventional control/monitor signal transmission system that since a mediation station is equipped in place of a control unit and a master station, it is simple, small-sized, easy in maintenance, and low in price, and also since remote control is performed without involving a control unit or a master station, a control delay which results from, for example, scanning time of the inside of a control unit or a master station does not occur, and high-speed transmission control can be realized.

Transmission from a mediation station to a different actuating apparatus which is in a correspondence relationship may be performed for each minimum unit of monitor data (for every one clock) or for each block which includes a predetermined number of minimum units of monitor data, for example, in every one cycle of control data. By appropriately setting such data transmission timing, when a distance between input and output is long, an effect of wiring extension is obtained. For example, there is an effect in which it can be used when a distance between input and output within large buildings is long.

Transmission timing of monitor data can be more effectively set through an appropriate data transceiving method. In detail, a control data signal has an output period during which data is transmitted from a mediation station to an actuating apparatus and an input period during which data is input from an actuating apparatus to a mediation station, and when virtual two-way communication is performed, communication speed can be improved, and a limit of a wiring allowable distance does not depend on device processing, and a wiring length can nearly reach a limit of a wiring allowable distance.

Also, the control data is transmitted subsequent to a start signal which represents a start of transmission, and a slave station updates a sequential address count by the clock signal, starting from the start signal, based on the start signal and a clock signal which configures the control data and performs transmission synchronization. Therefore, even though input and output are increased or decreased, it can be simply dealt with by mere changing an address. A degree of freedom of dealing with input and output is increased.

Each group of a data signal line can be separately extended in a most appropriate direction from a mediation station, but when two groups are extended in directions opposite to each other from a mediation station, a transmission rate is typically reduced, but there is an effect of increasing a transmission distance (between input and output) twice while maintaining the same transmission rate and reliability.

What is claimed is:

1. A control/monitor signal transmission system, comprising:
   a plurality of actuating apparatuses each of which includes an actuator unit and a sensor unit which monitors the actuator unit;
   a plurality of slave stations which are installed corresponding to the plurality of actuating apparatuses, the plurality of slave stations being connected through a consolidated data signal line; and
   a mediation station which is connected to the consolidated data signal line,
   wherein the consolidated data signal line includes a plurality of independent groups of data signal lines, which are consolidated to the mediation station,
   the plurality of actuating apparatuses belong to one or plural sets including at least two, and the actuating apparatuses which belong to a same set of actuating apparatuses and which are connected to different independent groups of the plurality of independent groups of data signal lines have a correspondence relationship,
   the mediation station extracts monitor data from a monitor signal transmitted from the sensor unit through the slave station, and transmits the monitor data as control data to a different actuating apparatus which is in a correspondence relationship with an actuating apparatus including the sensor unit which transmits the monitor data, and the signal of the control/monitor data has an output period and an input period within a single clock cycle, during which output period the control data is output from the mediation station to the different actuating apparatus and during which input period the monitoring data is input from the slave station, which is in a correspondence relationship with the different actuating apparatus to the mediation station.

2. The control/monitor signal transmission system of claim 1,
   wherein transmission from the mediation station to the different actuating apparatus which is in the correspondence relationship is performed for each minimum unit of the monitor data.

3. The control/monitor signal transmission system of claim 1,
   wherein transmission from the mediation station to different actuating apparatus which is in the correspondence relationship is performed for each block which includes a predetermined number of minimum units of the monitor data.

4. The control/monitor signal transmission system of claim 1,
   wherein a signal of the control data has an input period during which data is output from the mediation station to the actuating apparatus and an output period during which data is input from the actuating apparatus to the mediation station.

5. The control/monitor signal transmission system of claim 1,
   wherein the control data is transmitted subsequent to a start signal which represents a start of transmission, and the slave station updates a sequential address count by the clock signal, starting from the start signal, based on the start signal and a clock signal which configures the control data and performs transmission synchronization.

6. The control/monitor signal transmission system of claim 1,
   wherein the plurality of independent groups of data signal lines are respectively separately extended from a mediation station.

7. The control/monitor signal transmission system of claim 6,
   wherein two of the plurality of independent groups of data signal lines are extended from a mediation station in directions opposite to each other.

* * * * *